2 Sheets—Sheet 2.
S. HARRIS.
Railroad Rail-Joint.
No. 227,896. Patented May 25, 1880.
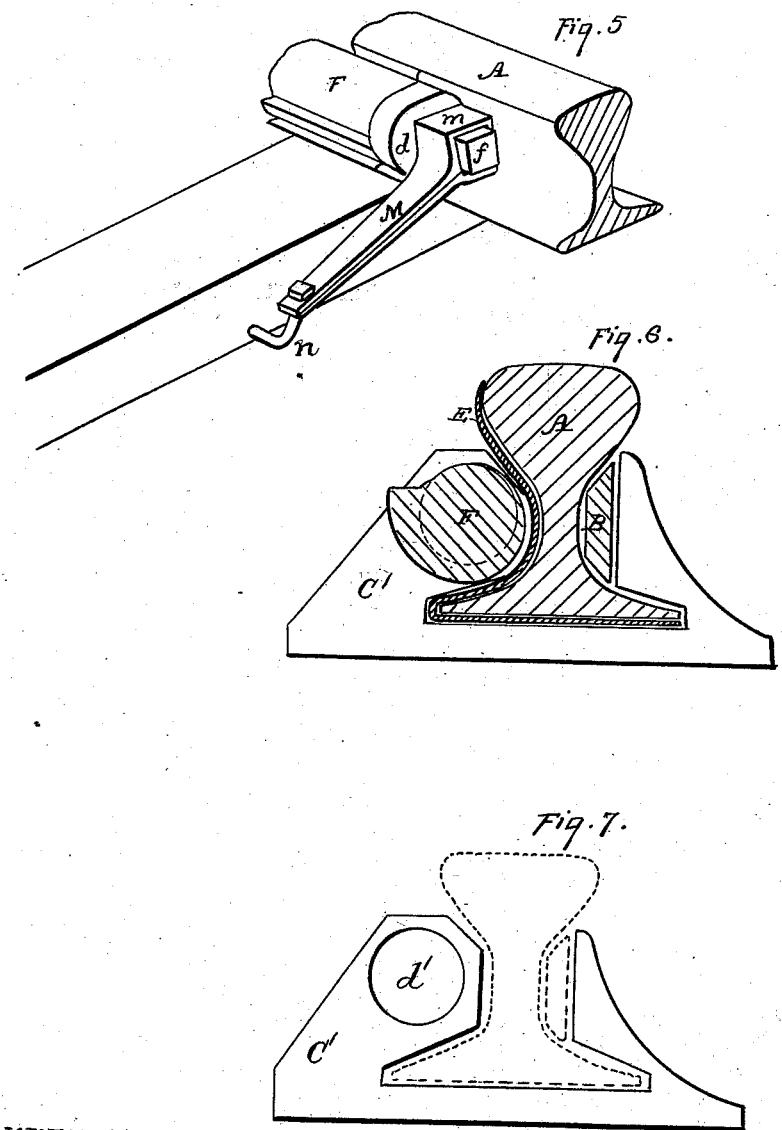
WITNESSES.
INVENTOR
Silas Harris
By Dewey & Co.
Attys

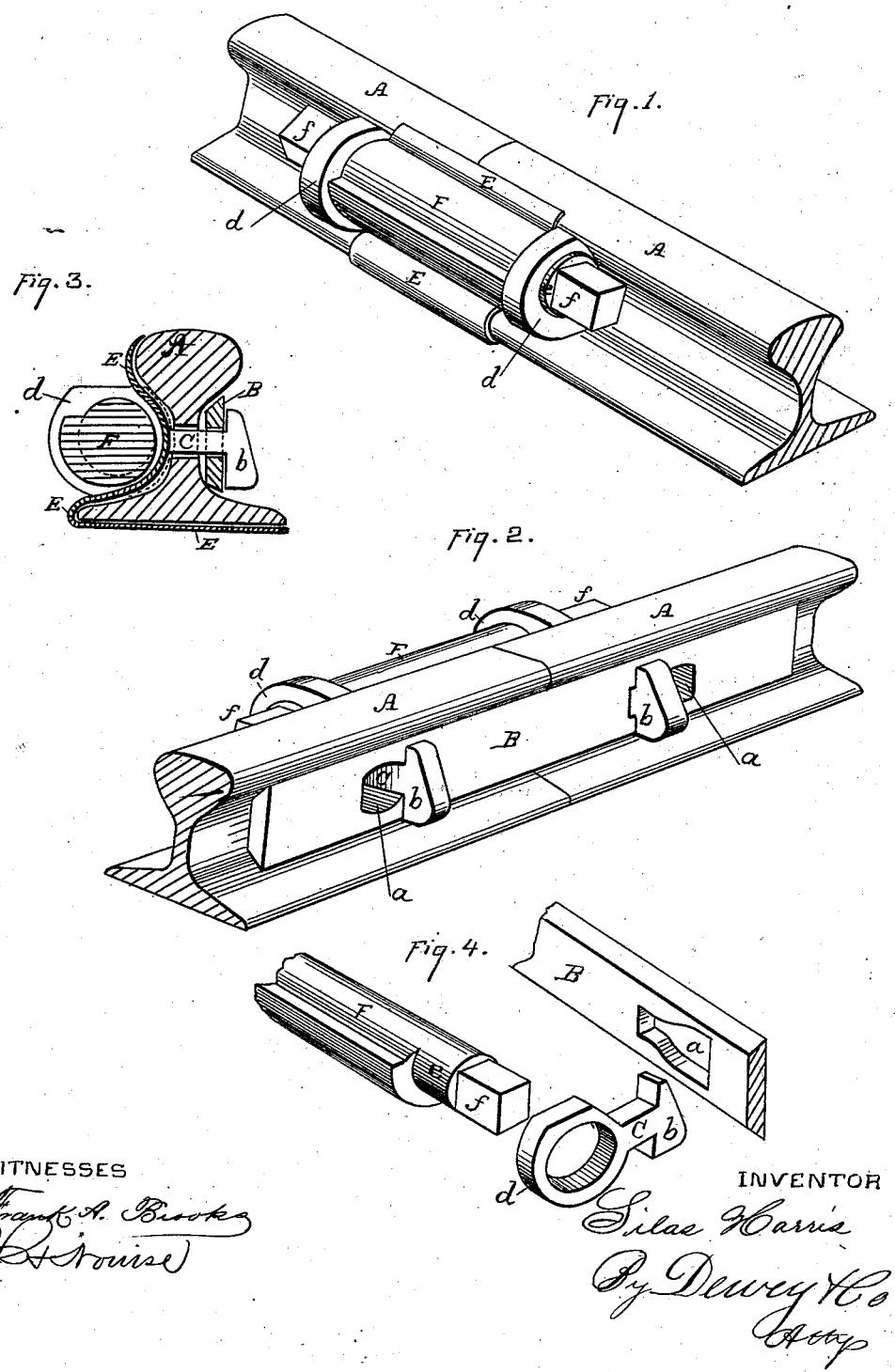

UNITED STATES PATENT OFFICE.

SILAS HARRIS, OF SAN FRANCISCO, CALIFORNIA.

RAILROAD-RAIL JOINT.

SPECIFICATION forming part of Letters Patent No. 227,896, dated May 25, 1880.

Application filed October 28, 1879.

*To all whom it may concern:*

Be it known that I, SILAS HARRIS, of the city and county of San Francisco, and State of California, have invented a Railroad-Rail Joint; and I hereby declare the following to be a full, clear, and exact description thereof.

My invention relates to certain improvements in those appliances which are intended to unite the meeting ends of railroad-rails; and my improvements consist in binding the fish-plate against the sides of the rail by means of an eccentric horizontal bolt or fastening connected with said fish-plate through peculiarly-formed bolts or plates. The eccentric joins the parts together immovably and dispenses with all nuts or screw-bolts, as is more fully described in the accompanying drawings, in which—

Figures 1 and 2 are perspective views. Fig. 3 is a transverse section. Fig. 4 represents three parts separated. Fig. 5 shows the method of securing the bolt. Figs. 6 and 7 are modifications.

The ordinary form of rail-joint is made by means of fish-plates on each side of the rail, crossing the joint, slots being formed through the fish-plates and rail, so that bolts may pass through them, these bolts being secured in place by nuts. The difficulty with this connection is, that the nuts are continually being shaken loose until the bolts fall out and the plates drop off, leaving the meeting ends of the rails without proper support.

I propose to obviate this difficulty by discarding the screw-bolts entirely and using bolts which are held in place by an eccentric, which, while it can be loosened when desired, will not jar loose by the passage of trains.

The ends of the rails A are brought together in the usual manner and the fish-plate B put on one side, as shown. This fish-plate has peculiarly-shaped holes or slots a, through which pass the heads b of the bolts C, said bolts being provided at their opposite ends with the rings or eyes d. The heads of the bolts are made somewhat hammer-shaped, one edge being beveled off from above, so that the flanges of the passing wheels of the cars will not strike them. The slots in the rail and fish-plate are made of corresponding shape, so the heads of the bolts may be put through sidewise and then turned up edgewise when in use.

When the fish-plate is in position the heads of the bolts are pushed through the slots in rails and plate, and the bolts then turned up edgewise. On the other side of the rail, and covering the joint, is an elastic plate, E, corresponding in shape to the side of the rail and flange, this plate being placed between the bolts, as shown. Between it and the rail may be put a piece of rubber, if desired.

The eccentric bolt or rod F is made with square heads f f, and the shanks e e are circular, to fit the eyes or rings d of the bolts C. This eccentric bolt is placed between the bolts C C and the rings of said bolts slipped over it by sliding said bolts toward each other, the elongated slots in the plates and rail admitting of this movement. When in position the rings d of the bolts C will encircle the shanks e e of the eccentric bolt F, as shown.

Now, by applying a wrench to the square end of the eccentric bolt and turning it the eccentric will bear forcibly against the spring-plate E and draw the heads of the bolts on the other side tight against the fish-plate. This action will draw the fish-plate firmly against the rail, the ends of the rails then being held between said fish-plate and the elastic plate as in a vise. It will not be so tight, however, as to prevent longitudinal motion of the rail induced by changes of temperature, but will prevent any lateral motion and form a tight joint.

The body of the bolt F being made in eccentric form, as shown, the ends of this eccentric portion form shoulders, against which the rings of the bolts or the shanks or circular part of the eccentric will impinge.

The elastic plate E may be extended over the edge of the flange and across under the rail, thus forming a chair and plate combined, and I prefer to construct it in this manner. My reason for constructing this plate so as to bear on the flange and side of the T portion only until pressure is brought to bear on its center is, that I gain a tighter gripe on the rail when the eccentric bears its center in against the joint of the rails. The elastic nature of this plate also tends to keep the fish-plate on the opposite side in position, even when subject to great jar, which it does better than if the strain were perfectly rigid.

The device forming the connecting parts between the eccentric and fish-plate may be made to pass under the rail, instead of through it, in case it is not desired to cut holes or slots through the ends of the rails, as is customary. In this case plates C' are formed with spaces or holes in them corresponding in shape to the flange and rib of the rail, and holes d' formed on one side to inclose the shanks of the eccentric bolt, as shown in Figs. 6 and 7. These plates are then slipped over the ends of the rails and the rails set together, the plates coming on each side of the tie on which the ends of the rails rest. The eccentric bolt then being put in the holes or rings in the plates, the same as in the rings of the bolts, by turning the eccentric the edges of the plates C' on the other side draw the fish-plate against the rail, the same as the bolts do. When the plates are used in this way it is not necessary to perforate either plates or rails, the fish-plate being held in position by the plates C' passing around under the rail, instead of the bolts C passing through it. This method of securing the meeting ends of rails and securing the joint is simple. The eccentric jams the parts when turned by the wrench, and when turned back by the same means is easily removed for replacement of rails.

The fish-plate may be made shorter than when bolts alone are used, since so much firmer bearing against the rail is maintained. Instead of screwing up four or six bolts to secure a joint, half a turn of the eccentric binds the fish-plate in place, and there are no nuts to work loose. Moreover, I only need a fish-plate on one side, since the elastic plate on the other answers the purpose of a fish-plate on that side.

A spring-lock, M, is formed of a piece of metal having a wrench-shaped end, m, of proper size to fit over the square head f of the eccentric F. After the eccentric is turned in place this spring-lock may be fitted onto said eccentric at either end, and the dog n, attached to its outer end, is driven into the tie on which the rails rest. By this means the eccentric is locked in such a manner that it cannot be turned or loosened. When, however, any change is necessary, the dog may be driven back and the spring-lock, removed from the eccentric, then be loosened by means of suitable wrenches.

Having thus described my invention, what I claim as new, and desire to secure by Letters Patent, is—

1. The rails A A and fish-plate B, in combination with the connecting devices, substantially as described, and an eccentric securing-bolt, for the purpose set forth.

2. In combination with the rails A and fish-plate B, the bolts C, with their beveled heads b and rings d, the eccentric rod or bolt F, with its square heads f f and circular shanks e e, and the elastic plate E, fitted between said eccentric and the rails, whereby the fish-plates are secured in position on the sides of the rail, substantially as herein described.

3. In combination with the rail A, fish-plate B, connecting devices, and the eccentric rod or bolt F, the elastic plate E, interposed between the rail and eccentric bolt, whereby a fish-plate is dispensed with on one side of the rail and the opposite plate held in position by an elastic tension, substantially as herein described.

4. In combination with the eccentric fastening-bolt F, having a square head, f, and adapted to secure the fish-plate B in place beside the meeting ends of the rails A by means of the devices shown, the spring-lock M, with its wrench-shaped head m and dog n, whereby said eccentric is locked immovably in place and prevented from turning, substantially as herein described.

5. In combination with the rails A and eccentric fastening-bolt F, the elastic plate E, binding against the side of the rails and extending across under their meeting ends, whereby said elastic plate acts as a chair and fish-plate combined, substantially as herein described.

In witness whereof I have hereunto set my hand.

SILAS HARRIS.

Witnesses:
S. H. NOURSE,
FRANK A. BROOKS.